(12) United States Patent
Cantagrel

(10) Patent No.: US 10,428,221 B2
(45) Date of Patent: Oct. 1, 2019

(54) LIQUID POLYMERIZABLE COMPOSITION COMPRISING AN ANHYDRIDE DERIVATIVE MONOMER AND MINERAL NANOPARTICLES DISPERSED THEREIN, AND ITS USE TO MANUFACTURE AN OPTICAL ARTICLE

(71) Applicants: ESSILOR INTERNATIONAL (COMPAGNIE GENERALE D'OPTIQUE), Charenton le Pont (FR); NIKON CORPORATION, Tokyo (JP)

(72) Inventor: Guillaume Cantagrel, Toshima-ku (JP)

(73) Assignees: ESSILOR INTERNATIONAL, Charenton-le-Pont (FR); NIKON CORPORATION, Tokyo (JP)

( * ) Notice: Subject to any disclaimer, the term of this patent is extended or adjusted under 35 U.S.C. 154(b) by 116 days.

(21) Appl. No.: 15/105,266

(22) PCT Filed: Dec. 20, 2013

(86) PCT No.: PCT/IB2013/003006
§ 371 (c)(1),
(2) Date: Jun. 16, 2016

(87) PCT Pub. No.: WO2015/092466
PCT Pub. Date: Jun. 25, 2015

(65) Prior Publication Data
US 2017/0002206 A1    Jan. 5, 2017

(51) Int. Cl.
*C08F 122/40* (2006.01)
*C08F 122/04* (2006.01)
(Continued)

(52) U.S. Cl.
CPC .............. *C09D 4/00* (2013.01); *C08F 122/04* (2013.01); *C08F 122/40* (2013.01);
(Continued)

(58) Field of Classification Search
CPC .... C08K 2003/2206; C08K 2003/2237; C08K 2003/2244; C08K 2003/3036; C08K 3/22;
(Continued)

(56) References Cited

U.S. PATENT DOCUMENTS 7,070,832 B2   7/2006 Miyakawa et al.
9,201,168 B2   12/2015 Yamazaki et al.
(Continued)

FOREIGN PATENT DOCUMENTS

CN    102753618 A    10/2012
EP    2174966 A1    4/2010
(Continued)

OTHER PUBLICATIONS

Chemical Book, CAS 2051-76-5, http://www.chemicalbook.com/CASEN_2051-76-5.htm (retrieved Mar. 9, 2018).*
(Continued)

*Primary Examiner* — Kregg T Brooks
(74) *Attorney, Agent, or Firm* — Young & Thompson

(57) ABSTRACT

A liquid polymerizable composition including an anhydride derivative monomer with mineral nanoparticles homogeneously dispersed therein, as well as its use for the preparation of a transparent polymeric material having a high refractive index and its use in the optical field.

17 Claims, 2 Drawing Sheets

(51) Int. Cl.

| | | |
|---|---|---|
| C08F 222/04 | (2006.01) | |
| C08F 222/40 | (2006.01) | |
| C08F 2/44 | (2006.01) | |
| C08F 292/00 | (2006.01) | |
| C08K 3/22 | (2006.01) | |
| C08K 9/00 | (2006.01) | |
| C09D 4/00 | (2006.01) | |
| C09D 5/00 | (2006.01) | |
| G02B 1/04 | (2006.01) | |
| G02B 1/10 | (2015.01) | |
| C01G 25/02 | (2006.01) | |
| C01G 9/08 | (2006.01) | |
| C08F 222/36 | (2006.01) | |
| C08K 9/04 | (2006.01) | |
| C09D 7/61 | (2018.01) | |
| C09D 7/62 | (2018.01) | |
| C09D 7/40 | (2018.01) | |

(52) U.S. Cl.
CPC .......... *C08F 222/04* (2013.01); *C08F 222/36* (2013.01); *C08K 3/22* (2013.01); *C08K 9/04* (2013.01); *C09D 5/00* (2013.01); *C09D 7/61* (2018.01); *C09D 7/62* (2018.01); *C09D 7/67* (2018.01); *G02B 1/041* (2013.01); *G02B 1/043* (2013.01); *G02B 1/10* (2013.01); *C08K 2003/2244* (2013.01); *C08K 2201/005* (2013.01); *G02B 2207/101* (2013.01)

(58) Field of Classification Search
CPC ........ C08F 22/04; C08F 22/40; C08F 122/04; C08F 122/40; C08F 222/04; C08F 222/40; C08F 222/402; C08L 33/064; C08L 33/24; G02B 1/10; G02B 1/041; G02B 1/043; C09D 7/67
See application file for complete search history.

(56) References Cited

U.S. PATENT DOCUMENTS

| | | | |
|---|---|---|---|
| 2009/0220770 A1 | 9/2009 | Ueno et al. | |
| 2012/0322943 A1 | 12/2012 | Siol et al. | |
| 2013/0046050 A1* | 2/2013 | Siol | C08F 20/06 524/458 |
| 2013/0241092 A1 | 9/2013 | Takeuchi et al. | |
| 2015/0037535 A1* | 2/2015 | Akimoto | C08F 2/44 428/141 |
| 2015/0203710 A1 | 7/2015 | Feuillade et al. | |

FOREIGN PATENT DOCUMENTS

| | | | | |
|---|---|---|---|---|
| JP | 2007314773 A | 12/2007 | | |
| JP | 2009029931 A | 2/2009 | | |
| JP | 2013507514 A | 3/2013 | | |
| JP | 2015526545 A | 9/2015 | | |
| WO | WO-2012124693 A1 * | 9/2012 | ................ | C08F 2/44 |
| WO | 2013/047786 A1 | 4/2013 | | |
| WO | WO-2015076296 A1 * | 5/2015 | ........... | C07C 233/91 |

OTHER PUBLICATIONS

Partial machine translation of WO 2015/076296 A1.*
Lu C. et al. "A Facile Route to ZnS-Polymer Nanocomposite Optical Materials with High Nanophase Content via gamma-Ray Irradiation Initiated Bulk Polymerization" (Advanced material, 2006, 18, 1188-1192).
International Search Report, dated Sep. 15, 2014, from corresponding PCT application.
Changli Lü, et al., A Facile Route to ZnS-Polymer Nanocomposite Optical Materials with High Nanophase Content via γ-Ray Irradiation Initiated Bulk Polymerization, Advanced Materials, May 2006, pp. 1188-1192, vol. 18.

\* cited by examiner

LIQUID POLYMERIZABLE COMPOSITION COMPRISING AN ANHYDRIDE DERIVATIVE MONOMER AND MINERAL NANOPARTICLES DISPERSED THEREIN, AND ITS USE TO MANUFACTURE AN OPTICAL ARTICLE

The present invention concerns a liquid polymerizable composition for the preparation of a transparent polymeric material having a high refractive index and its use in the optical field.

The liquid polymerizable composition of the present invention comprises an anhydride derivative monomer with mineral nanoparticles homogeneously dispersed therein, said mineral nanoparticles being chosen in particular among ZnS, $ZrO_2$, $TiO_2$ or $BaTiO_3$.

In the last ten years, it has become more and more difficult to synthesize materials which have a refractive index higher than 1.6 as well as the other properties required in optical field (transparency i.e. high transmittance with low haze level, mechanical properties like chock resistance and abrasion resistance, optical properties including no optic distortion and high contrast, heat resistance, small shrinkage, chemical resistance . . . ) from pure organic monomers.

One solution to overcome this problem is to introduce mineral nanoparticles into the monomer composition in order to increase its refractive index. Typically, nanoparticles having a refractive index from 2.1 to 3 may be chosen among $ZrO_2$, $TiO_2$, $BaTiO_3$ or ZnS. However, with classical monomers having a refractive index around 1.5-1.6 (such as methylmethacrylate or styrene), the amount of nanoparticles required to achieve a high refractive index can be above 50% w/w, which may lead to the aggregation of the nanoparticles and adversely affect the transparency of the resulting material. Furthermore, it renders the material very brittle. To ensure good dispersibility of the nanoparticles into the monomer composition, the nanoparticles may require to be coated with a capping agent (such as hexanoic acid, methacrylic acid or methacryloxy trimethoxysilane). However, the capping agent generally has a refractive index of not more than 1.5 thereby reducing the benefit produced by the nanoparticle itself regarding the refractive index.

Therefore, the difficulty lies in the selection of the right combination of monomer composition, nanoparticles and capping agent, if required, that will ensure 1) a good stability over time of nanoparticles in the monomer composition and 2) a good dispersability of the nanoparticles into the monomer composition while leading to a transparent material exhibiting an increased refractive index as well as other advantages such as mechanical properties like for example chock resistance and abrasion resistance. Furthermore, the polymerizable composition obtained after mixing the monomer, nanoparticles and capping agent, if required, should be compatible with the substrate or support on which it is coated, and therefore display good adhesion properties on said substrate or support.

Lü C. et al. (Advanced material, 2006, 18, 1188-1192) disclose a polymerizable composition comprising N,N-dimethylacrylamide (N,N-DMAA) wherein a high content of mercaptoethanol-capped ZnS nanoparticles are dispersed. However, the refractive index of the poly N,N-DMAA is low (n=1.511 as measured with Metricon 9010/M Prism coupler $\lambda$=594 nm, 4 mW·$cm^{-2}$ for 10 min, 3 wt % Irg 184.), which makes it difficult to produce a material with high refractive index.

The inventors have found a new polymerizable composition comprising an anhydride derivative monomer whose structure results in a high refractive index, which is higher than the refractive index of poly N,N-DMAA, and wherein mineral nanoparticles such as ZnS $ZrO_2$, $TiO_2$ and $BaTiO_3$ can be homogeneously dispersed in order to increase the refractive index of the material.

In one embodiment, the nanoparticles are ZnS nanoparticles coated with one or more thiol-containing compounds which can reach higher refractive index than nanoparticles with typical capping agents. Furthermore, large amounts of such coated ZnS nanoparticles can be introduced into the anhydride derivative monomer with a very good dispersibility.

In another embodiment, the nanoparticles are $ZrO_2$, $TiO_2$ and $BaTiO_3$ nanoparticles which can be homogeneously dispersed in an anhydride derivative monomer without any capping agent.

The inventors have thus developed a polymerizable composition based on an anhydride derivative monomer within which mineral nanoparticles are homogeneously dispersed. Said nanoparticles have the advantage that they can be added into the composition in large amounts (up to 50% w/w) with a very good dispersibility and stability. The presence of said nanoparticles into the composition allows increasing the refractive index of the material which can be obtained by curing said polymerizable composition. Said material is able to show excellent optical properties, such as a transmittance higher than 80%.

Therefore, an object of the present invention is a liquid polymerizable composition comprising:

a liquid monomer composition containing a monomer of formula (I):

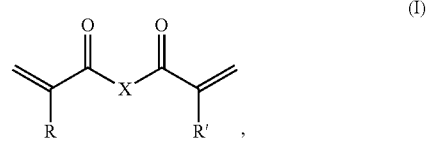

wherein:
R and R', identical or different, represent a hydrogen atom or a methyl group,
X is —O—, —S—, —NR1- or —CR2R3-,
R1 is chosen from aryl, heteroaryl, aryl C1-C6alkyl or heteroaryl C1-C6alkyl,
R2 and R3, identical or different, are chosen from, aryl, heteroaryl, aryl C1-C6alkyl, heteroaryl C1-C6alkyl, aryloxy, arylthio, aryl C1-C10alkyloxy, heteroaryl C1-C10alkyloxy, aryl C1-C10alkylthio, or heteroaryl C1-C10alkylthio, and mineral nanoparticles homogeneously dispersed in said monomer composition.

According to the invention, aryl means an aromatic ring comprising from 5 to 10 carbon atoms, consisting of one ring or several fused rings, said aryl ring being optionally substituted by 1 to 3 groups chosen independently from C1-C6 alkyl, C1-C6 alkoxy, C1-C6 alkylthio, or halogen atom, as defined below. In particular, aryl is preferably an optionally substituted phenyl.

Heteroaryl means a heteroaromatic ring comprising from 4 to 10 carbon atoms, and from 1 to 3 heteroatoms chosen from 0, S or N, said heteroaromatic ring being optionally substituted by 1 to 3 groups chosen independently among C1-C6 alkyl, C1-C6 alkoxy, C1-C6 alkylthio, or halogen atom, as defined below.

C1-C6 alkyl means a linear or branched alkyl group comprising from 1 to 6 carbon atoms. Alkyl groups include for instance methyl, ethyl, n-propyl, isopropyl, n-butyl, isobutyl, pentyl, and hexyl.

C1-C6 alkoxy means a C1-C6 alkyl-O— group, wherein C1-C6 alkyl is defined as above. C1-C6 alkoxy groups include for instance methoxy or ethoxy.

C1-C6 alkylthio means C1-C6 alkyl-S— group, wherein C1-C6 alkyl is defined as above. C1-C6 alkylthio include for instance methylthio or ethylthio.

Halogen atom includes chloro, bromo or iodo atoms.

Aryloxy means an aryl-O— group. Aryloxy includes for instance phenoxy or methylphenoxy.

Arylthio means an aryl-S— group. Arylthio includes for instance phenyl thio or methylphenylthio.

Aryl C1-C6 alkyl means the radical RR'— wherein R is an aryl and R' is a C1-C6alkyl, i.e. a linear or branched alkyl group comprising from 1 to 6 carbon atoms.

ArylC1-C10alkyloxy means the radical RR'—O— wherein R is an aryl and R' is a C1-C10alkyl, i.e. a linear or branched alkyl group comprising from 1 to 10 carbon atoms.

ArylC1-C10alkylthio means the radical RR'—S— wherein R is a aryl and R' is a C1-C10alkyl, i.e. a linear or branched alkyl group comprising from 1 to 10 carbon atoms.

HeteroarylC1-C6alkyl means the radical RR'— wherein R is a heteroaryl and R' is a C1-C6alkyl, i.e. a linear or branched alkyl group comprising from 1 to 6 carbon atoms.

HeteroarylC1-C10alkyloxy means the radical RR'—O— wherein R is a heteroaryl and R' is a C1-C10alkyl, i.e. a linear or branched alkyl group comprising from 1 to 10 carbon atoms.

HeteroarylC1-C10alkylthio means the radical RR'—S— wherein R is a heteroaryl and R' is a C1-C10alkyl, i.e. a linear or branched alkyl group comprising from 1 to 10 carbon atoms.

Without wishing to be bound by any theory, the two carbonyl groups of formula (I) act as a bis-chelating ligand that helps in dispersing the nanoparticles.

Moreover, R1, R2 and R3 can bear a high refractive index moiety, which helps in increasing the refractive index of the material which can be obtained by curing the polymerizable composition.

The nanoparticles are homogeneously dispersed in the monomer of formula (I) by solvation. Solvation involves different types of intermolecular interactions, such as hydrogen bonding, ion-dipole, dipole-dipole attractions or Van der Vaals forces.

In one embodiment, R and R' are identical.

In one embodiment, X is —O—. According to this embodiment, the monomer of formula (I) is methacrylic anhydride or acrylic anhydride. Preferably, the monomer of formula (I) is methacrylic anhydride.

In one embodiment, X is —S—. According to this embodiment, the monomer of formula (I) is acrylic thioanhydride or methacrylic thianhydride.

In one embodiment, X is —NR1-. According to this embodiment, R1 is chosen from aryl, heteroaryl, aryl C1-C6alkyl or heteroaryl C1-C6alkyl.

In one embodiment, X is —CR2R3-. According to this embodiment, R2 and R3, identical or different, are chosen from, aryl, heteroaryl, aryl C1-C6alkyl, heteroaryl C1-C6alkyl, aryloxy, arylthio, aryl C1-C10alkyloxy, (hetero)aryl C1-C10alkyloxy, aryl C1-C10alkylthio, or (hetero) aryl C1-C10alkylthio.

The monomers of formula (I) may be synthetized according to methods well known by the person skilled in the art, or be commercially available, such as methacrylic anhydride, acrylic anhydride.

For instance, the monomer of formula (I) may be synthetized as follows.

When X=O, the monomer of formula (I) can be obtained by dehydration or (meth)acrylation of (meth)acrylic acid.

When X=NR1, the monomer of formula (I) can be obtained by bis-acrylation of the corresponding primary amine (see Example 3).

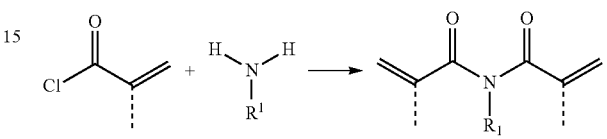

The liquid polymerizable composition of the invention may comprise only one monomer of formula (I) or a mixture of monomers of formula (I). If the monomer of formula (I) is solid, it may be solubilized in another monomer of formula (I) which is liquid in order to form a liquid polymerizable composition.

In one preferred embodiment, the liquid polymerizable composition of the invention consists essentially of one monomer of formula (I) or a mixture of monomers of formula (I).

According to the invention, the mineral nanoparticles are homogeneously dispersed in the monomer of formula (I), i.e. do not form aggregates having a size higher than 100 nm, as measured by transmission electronical microscopy. A homogeneous dispersion of nanoparticles allows obtaining a composite material whose haze after curing is below 5% as measured according to Japanese Industrial Standard No. K 7136-2000. Furthermore, the material composite is transparent.

The mineral nanoparticles may be chosen among ZnS, $ZrO_2$, $TiO_2$ or $BaTiO_3$.

The nanoparticles can be synthetized according to methods well known by the person skilled in the art, or be commercially available in the form of powder or a suspension in a solvent, such as methanol.

For instance, $TiO_2$ nanoparticles in suspension in methanol with a particle size of 60 nm are marketed by Sakai chemical under the commercial name SRD-2M.

For instance, $ZrO_2$ nanoparticles in suspension in methanol with a particle size of 35 nm are marketed by Sakai chemical under the commercial name SZR-M.

For instance, $BaTiO_3$ nanoparticles in the form of powder (cubic crystalline phase) with a particle size of less than 100 nm (BET) are marketed by Aldrich under the commercial name Barium Titanate (IV) (No. Cas: 12047-27-7).

According to the invention, the "particle size" is the diameter of the highest population of particles as measured with dynamic light scattering (DLS).

The particle size of the mineral nanoparticles is preferably less than 50 nm, more preferably between 30 and 5 nm. This size range allows limiting haze in the final polymerized material. It can be measured by dynamic light scattering (DLS), for instance by using Horiba SZ-100 size measurement instrument.

The nanoparticles of ZnS are preferably coated with one or more thiol-containing compounds. Preferably, nanoparticles of ZnS are coated with mercaptoethanol, thiophenol, mercaptophenol, or a mixture thereof.

Typically, the refractive index of the nanoparticles is as follows:
- ZnS, spharelite, cubic, n(589 nm)=2.3691 (Landolt-Bornstein Numerical Data and Functional Relationships in Science and Technology, III/30A, High Frequency Properties of Dielectric-Crystals. Piezooptic and Electrooptic Constants, Springler-Verlag, Berlin 1996);
- BaTiO3, tetragonal, ordinary ray: n(589 nm)=2.4405 (Shannon, R. D., Shannon, R. C., Medenbach, O., and Fischer, R. X., "Refractive Index and Dispersion of Fluorides and Oxides", J. Phys. Chem. Ref. Data 31, 931, 2002.);
- TiO2, rutile, tetragonal, ordinary ray: n(589 nm)=2.562 (Shannon, R. D., Shannon, R. C., Medenbach, O., and Fischer, R. X., "Refractive Index and Dispersion of Fluorides and Oxides", J. Phys. Chem. Ref. Data 31, 931, 2002.);
- ZrO2, tetragonal, ordinary ray: n(589 nm)=2.20 (Polymer Journal, 2008, 40, 1157-1163);

The particle size of the ZnS nanoparticles is less than 10 nm, preferably between 3 nm and 6 nm. This size range allows limiting haze in the final polymerized material.

Methods for preparing ZnS nanoparticles with capping agent(s), such as thiol-containing compound(s), are well known to the person skilled in the art.

For instance, $Zn(OAc)_2$ (a Zn source), the capping agent (s) and thiourea (a sulphur source) are dissolved in a solvent, such as DMF (dimethylformaldehyde), N,N Dimethylacetamide, or DMSO (dimethylsulfoxide) (for instance 2.5 g of $Zn(OAc)_2$ in 30 ml of DMF). Then the solution is heated under reflux under nitrogen atmosphere. At the end of the heating process, a transparent solution is obtained. A solvent such as ethanol, acetone, acetonitrile, toluene or water, is added to the solution to induce precipitation of the coated ZnS nanoparticles, depending on the particles properties. The precipitation allows the separation of the particles from the solvent and the capping agent which has not reacted. The solvent is chosen depending on the coupling agent. Typically, when thiophenol is used as a coupling agent, water is used to precipitate the coated particles. Particles may be separated from the solution by centrifugation and washed with methanol, acetonitrile or toluene. See for instance the method described in Changli Lü, Yuanrong Cheng, Yifei Liu, Feng Liu, and Bai Yang ("A Facile Route to ZnS-Polymer Nanocomposite Optical Materials with High Nanophase Content via Gamma-Ray Irradiation Initiated Bulk Polymerization", Adv. Mater., 2006, 18, 1188-1192.).

The above method advantageously allows the dispersion of the nanoparticle in powder form in the monomer composition, as opposed to other methods which require the dispersion of the nanoparticles into a solvent before the introduction into the monomer composition.

Suitable thiol-containing compounds include small molecules, such as those having a molar mass lower than 250 g/mol, containing one thiol function and having a refractive index higher than 1.5 (at 594 nm).

The thiol-containing compound of the invention is preferably chosen among mercaptoethanol, thiophenol, mercaptophenol, or a mixture thereof.

When preparing the coated nanoparticles of ZnS, the relative molar amounts of the Zn source, the thiol-containing compound and the S source is chosen so that during the process of preparation, no self precipitation occurs. Typically, the molar ratio of the thiol-containing compound over Zn is comprised between 0.5 and 3, preferably between 0.8 and 2. The molar ratio is the number of moles of thiol-containing compound for one mole of zinc acetate.

Preferably, the nanoparticles of ZnS are coated with a mixture of mercaptoethanol (ME) and thiophenol (PhS). The molar ratio of ME and PhS over Zn is comprised between 2.0 and 0.1, more preferably between 0.6 and 0.3. When the ZnS nanoparticles are coated with only with ME, the molar ratio of ME over Zn is comprised between 1.3 and 1.6.

Preferably, the molar ratio of PhS over ME is from 0.5 to 1, preferably from 0.5 to 0.7, more preferably is around 0.5.

The nanoparticles of ZnS have a crystal size comprised between 3 and 10 nm, more preferably between 3 and 6 nm. The crystal size can be determined by XR diffraction according to the Williamson-Hall method.

The nanoparticles of ZnS coated with said thiol-containing compound(s) have a particle size of comprised between 4 and 80 nm. The particle size of the coated nanoparticles can be determined by measurement with a Dynamic Light Scattering instrument (SZ-100 from Horiba) and correspond to size of highest population determine with this tool.

The amount of the mineral nanoparticles (coated if required or uncoated if not required) in the polymerizable composition is comprised between 5 and 60% w/w, preferably between 10 and 50% w/w based on the total weight of the liquid polymerizable composition.

The liquid polymerizable composition of the invention may comprise other ingredients typically used in polymerizable compositions, such as other monomers, a mold release agent, photo stabilizer, antioxidant, dye anti-coloring agent, fillers, UV light absorber or optical brightener.

Another object of the present invention is an optical substrate coated with the liquid polymerizable composition as previously defined.

In this invention "coating" or "coat" should be construed to cover not only regular coatings but also a resin layer having aspherical shape provided on a spheric or aspheric glass lens to obtain aspheric effect. The typical such resin layer is disclosed in U.S. Pat. No. 7,070,862.

The optical substrate may be any organic glass commonly known and used in the optical field. It may be a thermoplastic resin such as a thermoplastic polycarbonate, or a thermoset or photo-cured resin such as CR®, polyurethane or polythiourethane.

The thickness of the liquid polymerizable coating can be comprised between 1 μm and 1 mm.

Another object of the present invention is an optical article comprising:
(a) an optical substrate, and
(b) a coating obtained by thermal and/or UV curing of the liquid polymerizable composition as previously defined.

Another object of the present invention is to cure the liquid polymerizable as bulk material for optical article. The thickness of cured liquid polymerizable as bulk material can be comprised between 1 mm and 2 cm.

The optical article is preferably an optical lens, such as an ophthalmic lens, sunglass lens or other optical lens for optical instrument, and most preferably an ophthalmic lens. It may contain functional layers such as polarizing layers, anti-reflecting coatings, visible light and UV absorbing coatings, anti-choc coatings, abrasion-resistant-coating, anti-smudge-coating, anti-fog coating, anti-dust coating, photochromic coatings, all of which are familiar to the skilled person.

The liquid polymerizable composition coating may be applied onto the optical substrate by any suitable coating method such as dip-coating, bar coating, spray coating, or spin coating.

The curing of the resulting layer is done by subjecting the coated substrate to UV light and/or heat. The refractive index of the cured layer can be increased between 0.01 and 0.20 for example.

Another object of the present invention is the use of mineral nanoparticles having a refractive index which is higher than the refractive index of the monomer of formula (I), preferably higher than 2, for increasing the refractive index of a polymeric material obtained by thermal and/or UV curing of a liquid monomer composition containing a monomer of formula (I):

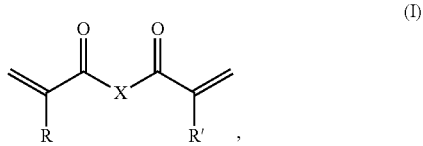

wherein:
R and R', identical or different, represent a hydrogen atom or a methyl group,
X is —O—, —S—, —NR1- or —CR2R3-,
R1 is chosen from aryl, heteroaryl, aryl C1-C6alkyl or heteroaryl C1-C6alkyl,
R2 and R3, identical or different, are chosen from, aryl, heteroaryl, aryl C1-C6alkyl, heteroaryl C1-C6alkyl, aryloxy, arylthio, aryl C1-C10alkyloxy, heteroaryl C1-C10alkyloxy, aryl C1-C10alkylthio, or heteroaryl C1-C10alkylthio, and
wherein said mineral nanoparticles are homogeneously dispersed in said monomer composition, and wherein said mineral nanoparticles have a refractive index which is higher than the refractive index of the monomer of formula (I), preferably higher than 2.

Preferably, the mineral nanoparticles are chosen among ZnS, $ZrO_2$, $TiO_2$ or $BaTiO_3$.

Figure 1:
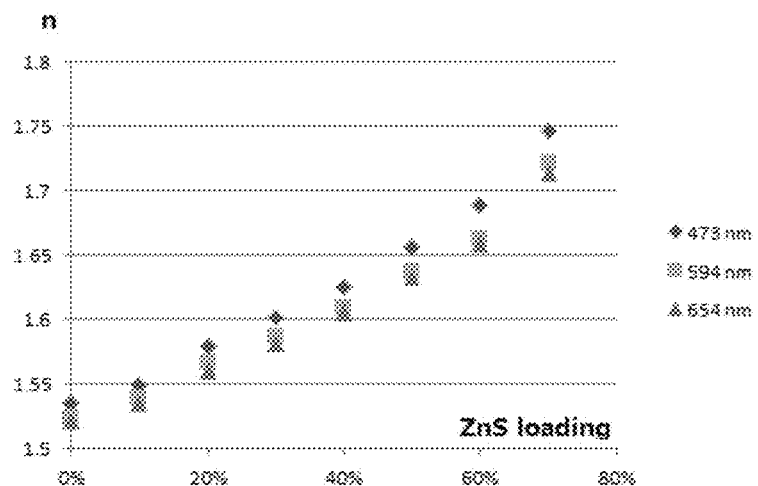
FIG. 1 shows the variation of the refractive index (n) according to the loading of ZnS nanoparticles (wt %) respectively at 473 nm, 594 nm and 654 nm.

The invention will now be further described in the following examples. These examples are offered to illustrate the invention and should in no way be viewed as limiting the invention.

EXAMPLES

1) Preparation of ZnS Nanoparticles Coated with a Thiol-Containing Compound $Zn(OAc)_2$, the capping agent and thiourea (TUA) are dissolved in DMF. Then the solution is heated under reflux at 160° C. under nitrogen atmosphere. At the end of the heating process, a transparent solution is obtained. The solution is poured in methanol, acetonitrile or water to induce the precipitation of the ZnS nanoparticles. Nanoparticles of ZnS are separated from the solution by centrifugation and washed with methanol or acetonitrile twice. The powder is dried under vacuum for 10 hours.

The capping agents used in this experiment are mercaptoethanol (ME) (CAS: 60-24-2), and thiophenol (PhS) (CAS: 108-98-5).

The relative molar amounts of $Zn(OAc)_2$, the capping agent and thiourea are indicated in table 1.

The amount of capping agent is chosen so that during reflux and after cooling of the mixture, no self-precipitation occurs. Relative molar amounts leading to a stable dispersion are indicated in table 1.

TABLE 1

| Compound | Relative molar amounts |
| --- | --- |
| ME | 0.6 |
| PhS | 0.3 |
| Zn(OAc)2 | 1 |
| TUA | 1.65 |

The mean crystal size of the ZnS nanoparticles (without coating) was determined according to the Williamson-Hall method. The mean crystal size of the ZnS nanoparticles was evaluated at 3.58 nm with a relative dispersion of 4.5% (measured by XR diffraction).

The particle size of the coated ZnS nanoparticles was measured using Horiba SZ-100 size measurement instrument after cooling of the dispersion in DMF. The results show a particle size of around 7 nm with a narrow distribution size going from 4 to 14 nm. This small particle size and narrow distribution size allow the limitation of light scattering in the final composite.

2) Preparation of a Liquid Polymerizable Composition Comprising ZnS Nanoparticles Coated with a Thiol-Containing Compound Dispersed in Methacrylic Anhydride ZnS nanoparticles coated with PhS and ME were introduced into methacrylic anhydride (marketed by Aldrich, CAS: 760-93-0 under the commercial name methacrylic anhydride) in a vial at 60° C. under ultrasonic waves during one day, in various amounts (10 wt %, 20 wt % 30 w %, 40 wt %, 50 wt %, 60 wt %, 70 wt %). Homogeneous dispersions could be obtained up to 60 wt %. At 70 wt %, the dispersion is not completely homogenous. In fact, it can be observed some aggregates having a size higher than 100 nm.

The obtained compositions were applied between two glass plates separated by a spacer of 500 μm. Photopolymerization was performed after addition of 1 wt % of a radical photoinitiator (Irgacure184, BASF) and illumination with a Hg lamp during 10 min (450 mW·cm$^{-2}$). Photopolymerization was induced between two glass substrates to avoid the inhibition by oxygen. A Silicon spacer of 500 μm was used between the two glass substrates. The resulting thickness of the cured material was 500 μm. For the 60 wt % and 70 wt % compositions, photopolymerization was performed directly in the vial because the viscosity of the compositions was too high to use the glass substrates.

The refractive index (n) of the cured material was measured after demolding using a Metricon 2010M (prism coupling method). The results are indicated in table 2.

TABLE 2

| Amount of nanoparticles dispersed (wt %) | Refractive index of the cured material at various wavelengths | | | Δn at 594 nm | Abbe number |
|---|---|---|---|---|---|
| | 473 nm | 594 nm | 654 nm | | |
| 0% | 1.535 | 1.524 | 1.522 | | 45 |
| 10% | 1.549 | 1.539 | 1.535 | 0.015 | 44 |
| 20% | 1.579 | 1.566 | 1.560 | 0.042 | 38 |
| 30% | 1.601 | 1.586 | 1.582 | 0.062 | 33 |
| 40% | 1.625 | 1.609 | 1.605 | 0.085 | 33 |
| 50% | 1.656 | 1.638 | 1.633 | 0.114 | 32 |
| 60% | 1.689 | 1.663 | 1.659 | 0.139 | 26 |
| 70% | 1.746 | 1.721 | 1.714 | 0.197 | 25 |

The data of table 2 shows that the refractive index of the polymer may be increased by 0.197 at 594 nm with the addition of 70 wt % of ZnS nanoparticles compared with the same polymer without nanoparticles.

Furthermore, at every wavelength, the refractive index of the polymer increases with increasing amounts of ZnS nanoparticles. The maximum refractive index obtained is 1.746 at 473 nm with 70 wt % of ZnS nanoparticles.

The transmittance at 400 nm was measured with a spectrophotometer UV-Vis (Hitachi U-4100).

Haze was measured after demolding with a spectrophotometer UV-Vis (Hitachi U-4100) according to Japanese Industrial Standard No 7136-2000 (equivalent to ISO 14782-1999).

Front scattering was measured with a spectrophotometer UV-Vis (Hitachi U-4100). Transmittance, front scattering and haze are indicated in table 3.

TABLE 3

| Optical properties | 0 wt % | 10 wt % | 20 wt % | 30 wt % | 40 wt % | 50 wt % |
|---|---|---|---|---|---|---|
| T (400 nm) | 87% | 86% | 85% | 78% | 82% | 78% |
| Front Scattering 400-800 nm | 1.2% | 0.91% | 2.2% | 1.8% | 1.4% | 5.8% |
| Haze: | | | | | | |
| 392 nm | 1.2% | 0.87% | 2.2% | 1.9% | 1.3% | 6.5% |
| 436 nm | 1.1% | 0.77% | 2.1% | 1.6% | 1.2% | 6.0% |
| 544 nm | 0.97% | 0.62% | 1.9% | 1.5% | 1.1% | 5.5% |
| 653 nm | 0.90% | 0.54% | 1.8% | 1.4% | 1.0% | 5.2% |

The data of table 3 shows that haze is lower than 5% when loading of nanoparticles is below 50 wt %, which indicates the good dispersing behaviour of ZnS nanoparticles into methacrylic anhydride. When the loading of nanoparticles is higher than 50 wt %, haze is higher than 5% due to some aggregation of the nanoparticles.

At 60 wt % and 70 wt %, transmittance and haze could not be measured.

FIG. 1 shows the variation of the refractive index (n) according to the loading of ZnS nanoparticles (wt %) respectively at 473 nm, 594 nm and 654 nm.

Figure 2:
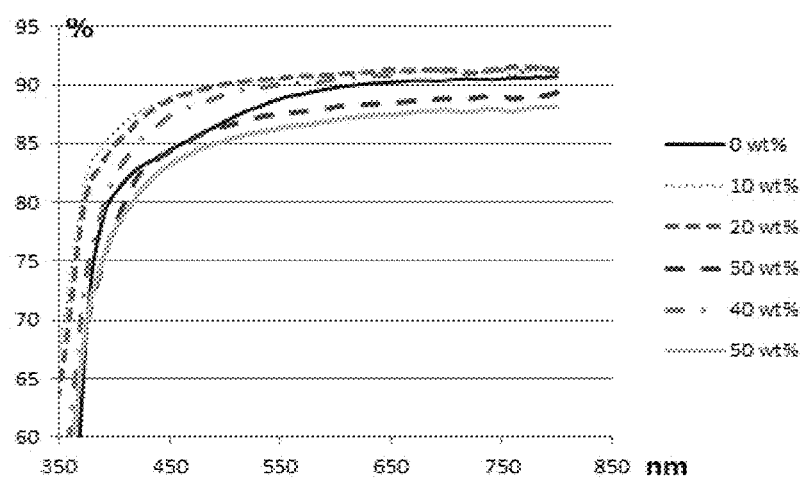
FIG. 2 shows the variation of the transmittance (T) according to the wavelength (nm) for every ZnS loading (wt %).

FIG. 2 shows the variation of the transmittance (T) according to the wavelength (nm) for every ZnS loading (wt %).

Figure 3:
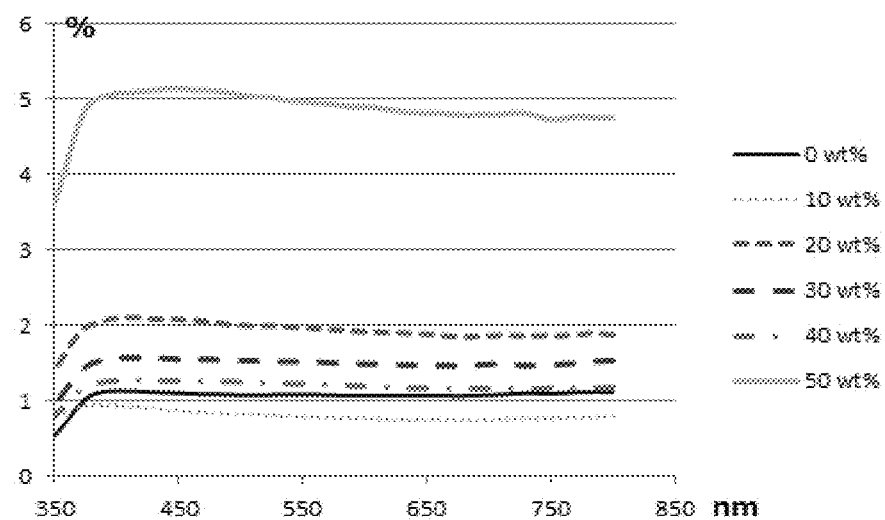
FIG. 3 shows the front scattering of the polymer for every ZnS loading (wt %).

FIG. 3 shows the front scattering of the prepared samples. If concentration is less then 50 wt %, the dispersion is homogeneous.

3) Preparation of a Liquid Polymerizable Composition Comprising $ZrO_2$ Nanoparticles Dispersed in Methacrylic Anhydride Five compositions were prepared by adding to methacrylic anhydride (marketed by Aldrich, CAS: 760-93-0 under the commercial name methacrylic anhydride) respectively 10 wt %, 20 wt %, 30 wt %, 40 wt % and 50 wt % of $ZrO_2$ from a suspension of $ZrO_2$/MeOH (30 wt % in MeOH, commercially available from Sakai chemical), and then adding to this mixture 3 wt % of Irgacure 184 (a radical photoinitiator marketed by BASF). The methanol of the resulting composition was evaporated under reduced pressure. Methacrylic anhydride could homogeneously disperse $ZrO_2$ nanoparticles up to 60 wt %.

Then, each composition was applied between two glass plates separated by a spacer of 500 µm. Photopolymerization was performed by illumination with a Hg lamp during 10 min (15 mW·cm$^{-2}$). Photopolymerization was induced between two glass substrates to avoid the inhibition by oxygen. A Silicon spacer of 500 µm was used between the two glass substrates.

The refractive indexes and Abbe number of the resulting materials are indicated in table 4.

TABLE 4

| Amount of nanoparticles dispersed (wt %) | Refractive index of the cured material at various wavelengths | | | Δn at 594 nm | Abbe number |
|---|---|---|---|---|---|
| | 473 nm | 594 nm | 654 nm | | |
| 0% | 1.535 | 1.524 | 1.522 | | 45 |
| 10% | 1.546 | 1.536 | 1.532 | 0.012 | 43 |
| 20% | 1.564 | 1.553 | 1.549 | 0.029 | 41 |
| 30% | 1.590 | 1.578 | 1.574 | 0.054 | 40 |
| 50% | 1.642 | 1.628 | 1.624 | 0.104 | 38 |

The data of table 4 shows that the refractive index of the polymer may be increased by 0.104 at 594 nm with the addition of 50 wt % of $ZrO_2$ nanoparticles compared with the same polymer without nanoparticles.

Furthermore, at every wavelength, the refractive index of the polymer increases with increasing amounts of $ZrO_2$ nanoparticles. The maximum refractive index obtained is 1.642 at 473 nm with 50 wt % of $ZrO_2$ nanoparticles.

By comparing the data of table 2 with the data of table 4, it appears that the increase of the refractive index of the polymer is higher with ZnS nanoparticles than with $ZrO_2$ nanoparticles.

Transmittance at 400 nm, front scattering and haze are indicated in table 5.

TABLE 5

| Optical properties | 0 wt % | 10 wt % | 20 wt % | 30 wt % | 50 wt % |
|---|---|---|---|---|---|
| T (400 nm) | 87% | 79% | 79% | 55% | 67% |
| Front Scattering 400-800 nm | 1.2% | 3.6% | 2.6% | 3.4% | 5.3% |
| Haze: | | | | | |
| 392 nm | 1.2% | 3.9% | 2.7% | 5.6% | 5.7% |
| 436 nm | 1.1% | 3.7% | 2.6% | 4.5% | 5.4% |
| 544 nm | 0.97% | 3.5% | 2.6% | 3.4% | 5.2% |
| 653 nm | 0.90% | 3.1% | 2.2% | 2.7% | 4.8% |

The data of table 5 shows that the haze is lower than 5% when loading of nanoparticles is below 50 wt %, which indicates good dispersion of the ZrO2 nanoparticles into methacrylic anhydride.

4) Preparation of a Liquid Polymerizable Composition Comprising ZrO₂ Nanoparticles Dispersed in N-Phenethyl Diacrylimide The following compound was synthetized according to protocol described in literature (Org. Biomol. Chem., 2006, 4, 3973-3979):

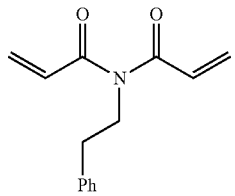 [SMILES: C=CC(=O)N(CCc1ccccc1)C(=O)C=C]

Seven compositions were prepared by adding to freshly prepared N-phenethyl diacrylimide) respectively 10 wt %, 20 wt %, 30 wt %, 40 wt %, 50 wt % and 60 wt % of ZrO₂ from a suspension of ZrO₂/MeOH (30 wt % in MeOH, commercially available from Sakai chemical), and then adding to this mixture 3 wt % of Irgacure 184 (a radical photoinitiator marketed by BASF). The methanol of the resulting composition was evaporated under reduced pressure. N-phenetyl diacrylimide could homogeneously disperse ZrO₂ nanoparticles up to 30 wt %.

Then, each composition was applied between two glass plates separated by a spacer of 500 µm. Photopolymerization was performed by illumination with a Hg lamp during 10 min (15 mW·cm⁻²). Photopolymerization was induced between two glass substrates to avoid the inhibition by oxygen. A Silicon spacer of 500 µm was used between the two glass substrates.

The refractive indexes, Abbe number, transmittance and haze of the resulting materials are indicated in table 6.

TABLE 6

| Optical properties | 0 wt % | 10 wt % | 20 wt % | 30 wt % | 40 wt % | 50 wt % | 60 wt % |
|---|---|---|---|---|---|---|---|
| 594 nm | 1.566 | 1.590 | 1.599 | 1.617 | 1.647 | 1.657 | 1.692 |
| δn | — | 0.024 | 0.033 | 0.051 | 0.081 | 0.091 | 0.126 |
| Abbe Number | 35 | 37 | 37 | 32 | 23 | 34 | 19 |
| T (400 nm) | 65% | 59% | 36% | 40% | 13% | — | — |
| Front scattering 400-800 nm | 5.7% | 4.9% | 4.4% | 7.0% | 12% | — | — |
| Haze | | | | | | | |
| 390 nm | 7.2% | 6.9% | 9.3% | 12% | 31% | — | — |
| 435 nm | 6.7% | 6.2% | 6.9% | 9.9% | 21% | — | — |
| 545 nm | 5.5% | 4.6% | 4.2% | 6.8% | 12% | — | — |
| 655 nm | 4.4% | 3.5% | 2.8% | 5.3% | 9.7% | — | — |

The data of table 6 shows that ZrO₂ is homogenously dispersed in the polymerizable composition up 30 wt %. Aggregates are formed at higher concentrations.

5) Comparative Examples

ZnS nanoparticles as prepared in example 1 were introduced in the following compounds.

2,5-dipentanone: no dispersion was observed. It may be due to the electronic repulsion of the carbonyl groups which prevents good chelation to the nanoparticle.

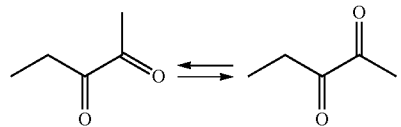

Acetylacetone: no dispersion was observed. It may be due to the fact that the predominant species is the tautomeric form bearing intramolecular H bonding.

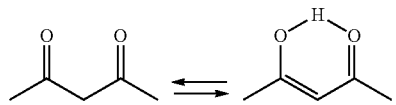

The invention claimed is:

1. A liquid polymerizable composition comprising:
a liquid monomer composition containing a monomer of formula (I):

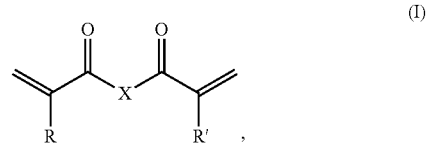

wherein:
R and R', identical or different, represent a hydrogen atom or a methyl group,
X is —O—, —S—, —NR1- or —CR2R3-,
R1 is selected from the group consisting of aryl, heteroaryl, aryl C1-C6 alkyl and heteroaryl C1-C6 alkyl,
R2 and R3, identical or different, are selected from the group consisting of aryl, heteroaryl, aryl C1-C6 alkyl, heteroaryl C1-C6 alkyl, aryloxy, arylthio, aryl C1-C10 alkyloxy, heteroaryl C1-C10 alkyloxy, aryl C1-C10 alkylthio, and heteroaryl C1-C10 alkylthio, and
mineral nanoparticles homogeneously dispersed in said monomer composition, wherein said mineral nanoparticles consist of a material selected from the group consisting of ZnS, ZrO₂, TiO₂ and BaTiO₃.

2. The liquid polymerizable composition of claim 1, wherein in formula (I), R and R' are identical.

3. The liquid polymerizable composition of claim 1, wherein in formula (I), X is —O—, —NR1- or —CR2R3-.

4. The liquid polymerizable composition of claim 1, wherein in formula (I), X is —O—.

5. The liquid polymerizable composition of claim 1, wherein in formula (I), X is —NR1- and R1 is selected from the group consisting of aryl, heteroaryl, aryl C1-C6 alkyl and heteroaryl C1-C6 alkyl.

6. The liquid polymerizable composition of claim 1, wherein in formula (I), X is —CR2R3- and R2 and R3, identical or different, are selected from the group consisting of aryl, heteroaryl, aryl C1-C6 alkyl, heteroaryl C1-C6 alkyl, aryloxy, arylthio, aryl C1-C10 alkyloxy, heteroaryl C1-C10 alkyloxy, aryl C1-C10 alkylthio, and heteroaryl C1-C10 alkylthio.

7. The liquid polymerizable composition of claim 1, wherein said nanoparticles have a particle size less than 50 nm.

8. The liquid polymerizable composition of claim 1, wherein the amount of said mineral nanoparticles in the polymerizable composition is comprised between 5% w/w and 60% w/w, based on the total weight of the liquid polymerizable composition.

9. An optical substrate coated with the liquid composition according to claim 1.

10. The optical substrate according to claim 9, wherein the article is an ophthalmic lens or an optical lens for optical instrument.

11. An optical article cured of the liquid composition according to claim 1.

12. An optical article comprising:
    (a) an optical substrate, and
    (b) a coating obtained by thermal and/or UV curing of the liquid polymerizable composition according to claim 1.

13. The optical article according to claim 12, wherein the article is an ophthalmic lens or an optical lens for optical instrument.

14. The liquid polymerizable composition of claim 1, wherein the monomer of formula (I) is methacrylic anhydride.

15. The liquid polymerizable composition of claim 1, wherein said nanoparticles have a particle size between 30 nm and 5 nm.

16. The liquid polymerizable composition of claim 1, wherein the amount of said mineral nanoparticles in the polymerizable composition is comprised between 10% w/w and 50% w/w, based on the total weight of the liquid polymerizable composition.

17. A process for increasing the refractive index of a polymeric material obtained by thermal and/or UV curing of a liquid monomer composition containing a monomer of formula (I):

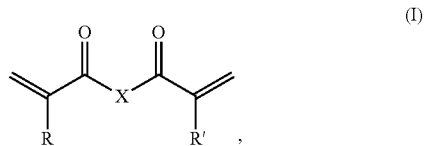

wherein:
R and R', identical or different, represent a hydrogen atom or a methyl group,
X is —O—, —S—, —NR1- or —CR2R3-,
R1 is selected from the group consisting of aryl, heteroaryl, aryl C1-C6 alkyl and heteroaryl C1-C6 alkyl, R2 and R3, identical or different, are selected from the group consisting of aryl, heteroaryl, aryl C1-C6 alkyl, heteroaryl C1-C6 alkyl, aryloxy, arylthio, aryl C1-C10 alkyloxy, heteroaryl C1-C10 alkyloxy, aryl C1-C10 alkylthio, and heteroaryl C1-C10 alkylthio, and
said process comprising the step of homogeneously dispersing mineral nanoparticles in said monomer composition, wherein said mineral nanoparticles consist of a material selected from the group consisting of ZnS, $ZrO_2$, $TiO_2$ and $BaTiO_3$.

* * * * *